United States Patent [19]

Shinman

[11] 4,052,934
[45] Oct. 11, 1977

[54] DEVICE FOR ATTACHMENT TO A FRYING PAN, COOKING POT OR LIKE COOKING UTENSIL

[76] Inventor: Sidney Shinman, 102 Sharps Lane, Ruislip, Middlesex, England

[21] Appl. No.: 650,903

[22] Filed: Jan. 21, 1976

[30] Foreign Application Priority Data

Jan. 23, 1975 United Kingdom ............... 3027/75

[51] Int. Cl.² ............................................. A47J 36/20
[52] U.S. Cl. .................................... 99/355; 210/474; D7/47
[58] Field of Search ................. D7/47, 129; 206/513; 220/94, 95, 19; 211/126; 210/470, 474, 495; 99/339, 413, 355, 450; 55/384

[56] References Cited

U.S. PATENT DOCUMENTS

| 1,233,909 | 7/1917 | Richardson | 99/355 |
| 1,763,174 | 6/1930 | Morris | 99/355 X |
| 2,332,117 | 10/1943 | Shepherd | 99/355 |
| 2,367,448 | 1/1945 | Thiele | 220/19 |

FOREIGN PATENT DOCUMENTS

| 5,540 | 1/1927 | Australia | 99/355 |
| 1,152,368 | 9/1957 | France | 99/355 |
| 16,975 | 7/1914 | United Kingdom | 99/355 |
| 22,760 | 11/1914 | United Kingdom | 99/355 |

Primary Examiner—Billy J. Wilhite
Attorney, Agent, or Firm—John J. Hart

[57] ABSTRACT

The Application describes a device for attachment to a frying pan, cooking pot or like cooking utensil. The device comprises an openwork substantially flat metal base of circular segment shape, a flange upstanding from the circumference of the base and support means located at or near the circumference of the base for supporting the device on the rim of the cooking utensil in an easily attachable and detachable manner.

6 Claims, 2 Drawing Figures

DEVICE FOR ATTACHMENT TO A FRYING PAN, COOKING POT OR LIKE COOKING UTENSIL

This invention relates to a device for attachment to a frying pan, cooking pot or like cooking utensil.

When preparing food in a frying pan, the need may arise for temporarily removing and storing some of the food items being fried, e.g. eggs or sausages, before returning them to the pan for further treatment, or for removing and storing finished fried food items either to drain off excess oil or fat prior to serving them, or to retain them until other food items being fried are ready cooked. During the storage period the food items may be desired to be kept hot, and in order to attain this, use of additional cooking utensils and a hotplate or a heated oven is usually reverted to.

It is an object of the present invention to avoid this inconvienience in a simple manner.

The invention consists in a device for attachment to a frying pan, cooking pot or like cooking utensil, the device comprising an open-work metal base member which is substantially flat and of circular segment shape, a flange upstanding from the curved radially outer limit of the base member, and support means disposed at or near the said outer limit for supporting the device on the rim of such a cooking utensil in an easily attachable and detachable manner.

The open-work metal base member may consist of an open mesh wire gauze or net structure provided at its curved outer limit with an upstanding flange which may also be formed from the wire gauze or net structure.

Preferably, however, the open-work metal base member consists of a plurality of wires curved to part-circular shape and located in a common plane in which the wires are disposed concentrically with respect to a notional common axis and at a mutual spacing which is large compared with the wire diameter and a few widely spaced straight wires extending substantially radially across the curved wires and fixed thereto such as by soldering or welding.

The support means may be in the form of feet attached to or formed integrally with the base member or the flange.

The device is so arranged that in use the base member is located entirely within the peripheral dimensions of the cooking utensil in order that, e.g. if the utensil is a frying pan, any oil or fat dripping off a fried item of food deposited on the base member falls safely into the frying pan.

In order that access to the food items in the frying pan is not unduly impeded, the device is so dimensioned that it covers rather less than half the opening of the cooking utensil. It will be appreciated that food stored on the device will be kept hot by heat rising from the bottom of the cooking utensil.

Two embodiments of the invention are described below by way of example with reference to the accompanying diagrammatic drawings, in which.

Figure 1:
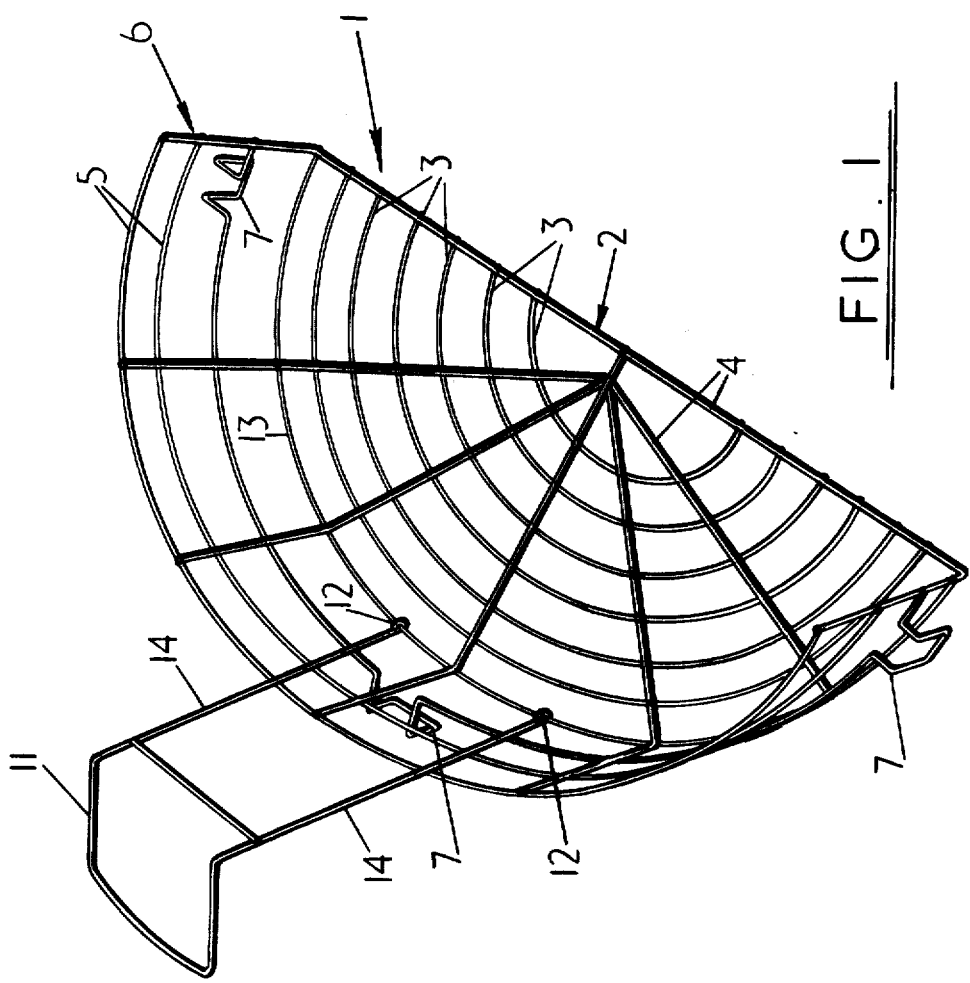
FIG. 1 illustrates a device according to the invention.

FIG. 1 illustrates a device 1 for attachment to a frying pan (not shown) and has a base member 2 produced from a plurality of mutually spaced, substantially concentrically disposed wires 3 bent to part-circular shape and held together by substantially radially extending straight wires 4 welded thereto at the respective crossing points. Preferably the straight wires 4 lie on top of the concentrically disposed wires 3 to permit the device to be used for a range of frying pans having a radius which is smaller than the largest radius of the device thereby to reduce the risk that the device slides inadvertently off the supporting rim of the pan. Also with the wires 4 in this position a kitchen tool, e.g. a spatula or a fish slice, can be more easily pushed under an item of food stored on the base, without becoming entangled in the concentric wires.

The radially outer ends of the straight wires 4 are bent upwardly and connected together by further co-axially disposed curved wires 5 to form an upstanding peripheral flange 6. One of the latter wires is furthermore provided with three outwardly and downwardly bent portions 7, one such portion being disposed near each end and one approximately in the centre of the wire, to serve as feet by which the device can rest on the rim of the frying pan, while the upstanding flange is located radially within the opening limited by the rim of the pan.

The feet may be arranged and disposed in various ways. Thus the centrally located foot may be so constructed that the base of the device is inclined slightly downwards from the centre towards the rim of the frying pan on which the device has been deposited, thereby to prevent items of food from sliding inadvertently back into the frying pan, and to cause any excess oil or fat to drip down preferably near the rim of the pan.

Furthermore, the feet of the present example are so constructed that the base member of the device, when in use, is located below the upper limit of the frying pan.

Figure 2:
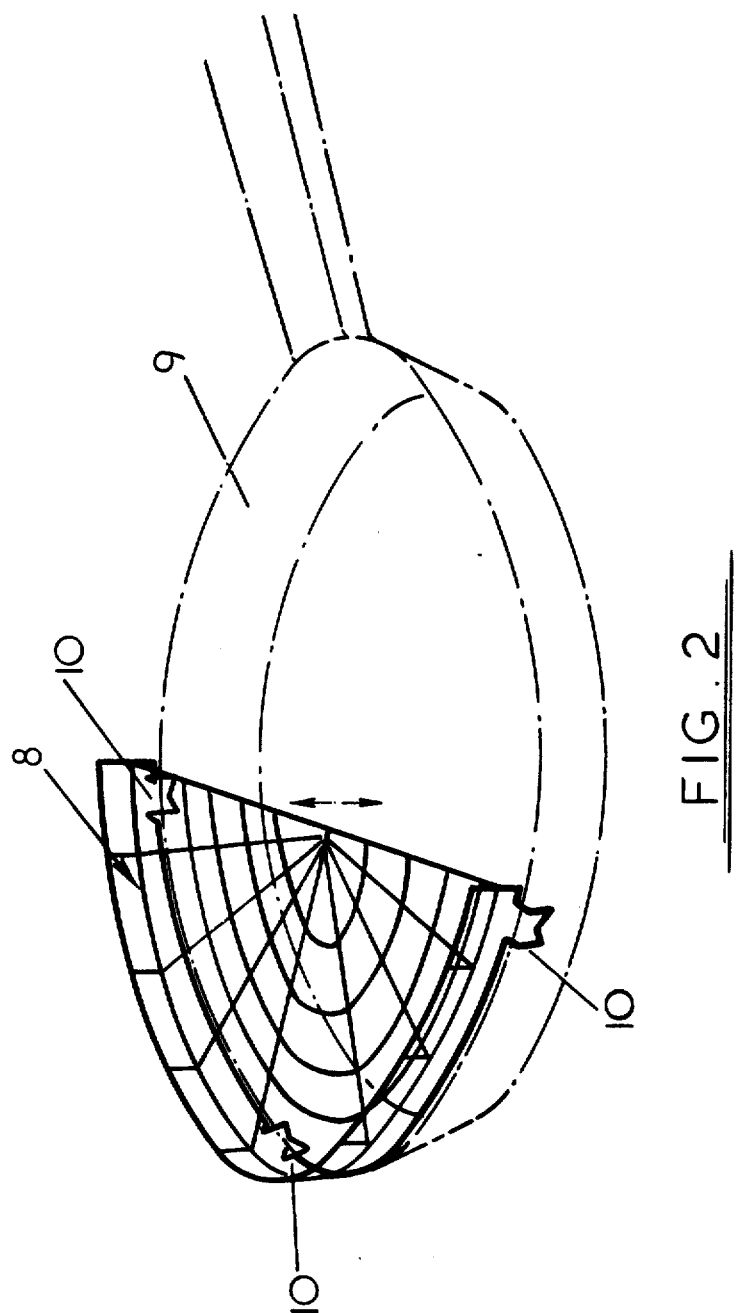
FIG. 2 illustrates a modification.

Alternatively the feet may be so arranged that the base member is located at the level of the upper limit of the pan. FIG. 2 illustrates a device 8 in position on a frying pan 9, the device being provided with feet 10 which raise the base of the device above the upper limit of the pan, otherwise the device 8 of FIG. 2 is constructed similarly to the device shown in FIG. 1.

For ease of handling, a handgrip may be provided on the device in any convenient manner. In the preferred embodiment illustrated in FIG. 1 such a handgrip 11 is constructed from wire bent to a substantially U-shaped and biasing limbs 14. The free end of these limbs are looped to form eyes 12 which engage around the outermost concentric wire 13 of the base member 2, whereby the handgrip can be folded down onto the base member when the device is to be stored. When the handgrip is folded upwardly into the position of use, the limbs 14 rest against the upstanding flange 6 and thereby permit safe conveyance of the device.

Although the device described above has been referred to as an attachment for a frying pan, no limitation is intended thereby, and it will be clear that the device is usable with advantage also in connection with saucepans, cooking pots and like cooking utensils.

Also, in order to facilitate production thereof, the device may be constructed in a manner which differs in some details from the illustrated embodiment, without thereby exceeding the scope of th appended claims. Thus, for example, instead of being welded thereto, the uppermost curved wire may be unitary with the upwardly bent straight wire portions forming the extreme ends of the upstanding peripheral flange.

What is claimed is:

1. A device for attachment to a frying pan, cooking pot or like cooking utensil, the device comprising an open-work metal base member which is substantially flat and of circular segment shape, a flange upstanding from the curved radially outer limit of the base member, support means disposed adjacent the said outer limit for supporting the device on the rim of such a cooking utensile in an easily attachable and detachable manner, and a handle pivotally mounted on the device for movement in a plane perpendicular to the base member between a first stored position in which at least a portion of the handle lies on the base member and a second carrying position in which at least a portion of the handle rests against the flange.

2. A device as claimed in claim 1, wherein the open-work metal base member consists of a plurality of wires curved to part-circular shape and located in a common plane in which the wires are disposed concentrically with respect to a notional common axis and at a mutual spacing which is large compared with the wire diameter, and a few widely spaced straight wires extending substantially radially across the curved wires and fixed thereto such as by soldering or welding.

3. A device as claimed in claim 2, wherein the upstanding flange is formed by the straight wires the radially outer end portions of which are arranged to extend out of the common plane, and by further wires curved to part-circular shape which extend across and are fixed to the end portions at locations which are widely spaced along the length thereof and which define a circumferential plane co-axial with the notional common axis.

4. A device as claimed in claim 3, wherein the support means comprise a plurality of wire portions integral with one of the further curved wires, each of which portions extends first radially outwardly and then axially downwardly thereby forming a downwardly open angle member to serve as a foot.

5. A device as claimed in claim 1, in which said handle comprises a lower portion having means at its lower end pivotally connecting the same to said base member for movement from a first stored substantially horizontal position to a second substantially vertical carrying position, said lower portion being of such length that in said second position it extends above said flange, and said handle having an upper portion extending transversely outwardly from said lower handle portion in the second position of the latter, said upper portion being substantially shorter in length than said lower portion.

6. A device as claimed in claim 5, in which said handle comprises a U-shaped piece of wire, the legs of said wire forming said lower portion and being deformed at their lower ends to provide said pivotal connection, the looped end of said U-shaped wire being disposed at an angle to said legs and forming said upper handle portion, and a transverse wire connected at its ends to the upper end portions of said legs and closing the opening formed by said looped end.

* * * * *